(12) United States Patent
Tamma

(10) Patent No.: US 9,112,754 B2
(45) Date of Patent: Aug. 18, 2015

(54) TECHNIQUES FOR GENERATING BIT LOG-LIKELIHOOD RATIOS IN COMMUNICATION SYSTEMS USING DIFFERENTIAL MODULATION

(71) Applicant: Raja V. Tamma, Leander, TX (US)

(72) Inventor: Raja V. Tamma, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 64 days.

(21) Appl. No.: 14/048,139

(22) Filed: Oct. 8, 2013

(65) Prior Publication Data

US 2015/0098514 A1   Apr. 9, 2015

(51) Int. Cl.
*H04L 27/06* (2006.01)
*H04L 27/20* (2006.01)
*H04L 1/00* (2006.01)

(52) U.S. Cl.
CPC .......... *H04L 27/2071* (2013.01); *H04L 1/0054* (2013.01)

(58) Field of Classification Search
CPC ....... H04L 1/00; H04L 1/0054; H04L 25/065; H04L 27/3818

USPC ......................................... 375/341, 262–265
See application file for complete search history.

(56) References Cited

U.S. PATENT DOCUMENTS

| 5,960,045 | A | 9/1999 | Duponteil et al. | |
|---|---|---|---|---|
| 7,321,643 | B2 * | 1/2008 | Chang et al. | 375/341 |
| 7,529,323 | B2 * | 5/2009 | Lui et al. | 375/341 |
| 8,806,306 | B2 * | 8/2014 | Humblet et al. | 714/780 |
| 2007/0110191 | A1 * | 5/2007 | Kim et al. | 375/340 |
| 2011/0019726 | A1 * | 1/2011 | Chappaz | 375/224 |
| 2012/0099628 | A1 * | 4/2012 | Kim et al. | 375/222 |

FOREIGN PATENT DOCUMENTS

| EP | 0 648 036 A1 | 4/1995 |
|---|---|---|
| EP | 0 793 371 A1 | 2/1996 |

* cited by examiner

*Primary Examiner* — Qutbuddin Ghulamali
(74) *Attorney, Agent, or Firm* — Yudell Isidore PLLC

(57) ABSTRACT

A technique for generating a bit log-likelihood ratio (LLR) in a communication system includes generating a demodulated signal based on a received symbol and a reference symbol. An input for a bit LLR generator is generated based on the demodulated signal and a normalization value that is based on the received symbol or the reference symbol. A bit LLR is generated for the received symbol, using the bit LLR generator, based on the input.

15 Claims, 7 Drawing Sheets

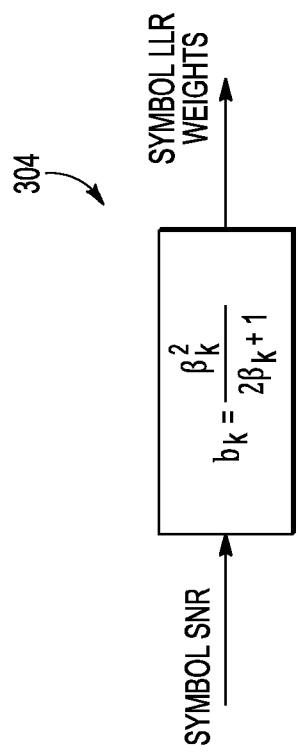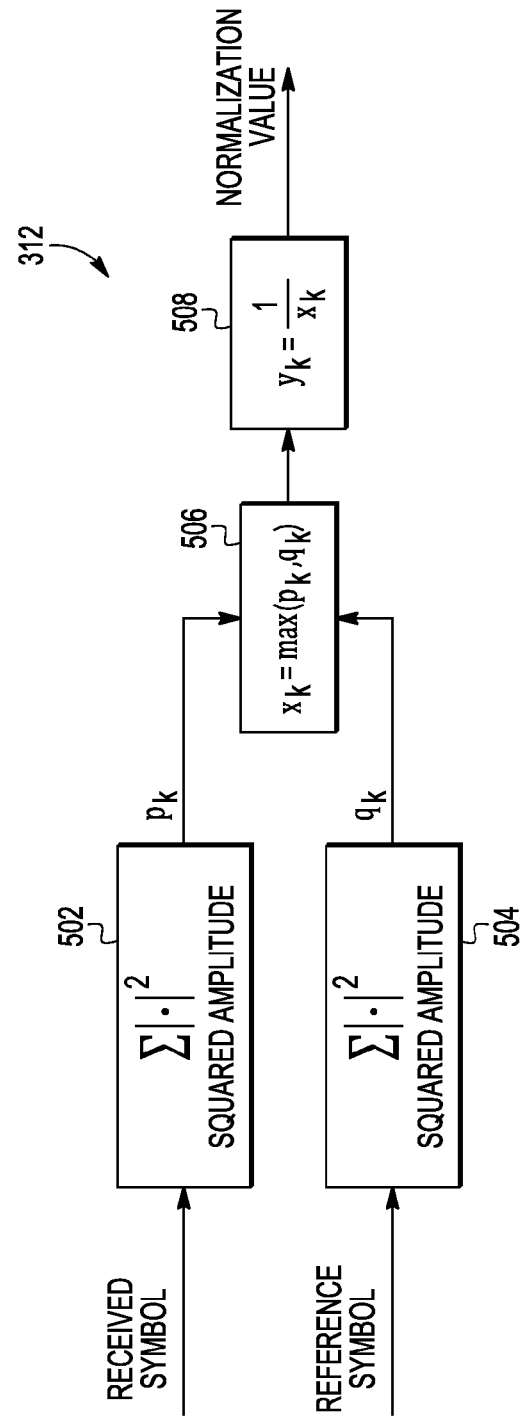

TECHNIQUES FOR GENERATING BIT LOG-LIKELIHOOD RATIOS IN COMMUNICATION SYSTEMS USING DIFFERENTIAL MODULATION

BACKGROUND

1. Field

This disclosure relates generally to communication systems and, more specifically, to generating bit log-likelihood ratios in communication systems using differential modulation.

2. Related Art

Channel coding or forward error correction (FEC) is a technique used in communication systems for controlling errors in data communication over unreliable or noisy channels. A transmitter of a communication system employing an FEC scheme adds controlled redundancy to an information bit stream. In a receiver, an FEC decoder may exploit the redundancy added in the transmitter while processing the demodulated bits to correct data communication errors. In general, the efficiency of an FEC decoder is improved when, instead of the demodulated hard bits, it is fed soft information which, in some way, manifests the likelihood of each demodulated bit being a '0' or a '1'. The soft information of each bit may be calculated as a function of the corresponding demodulated bit/symbol and the estimated noise variance affecting the bit. If the channel is not static but varies in time and/or frequency, the effective noise variance affecting each bit also varies accordingly.

A symbol can be described as a 'pulse' in digital baseband transmission or a 'tone' in passband transmission using modems that represents an integer number of bits. Theoretically, a symbol is a waveform, a state, or a significant condition of a communication channel that persists for a fixed period of time. In general, a transmitting device transmits a sequence of symbols via a communication channel at a fixed symbol rate and a receiving device detects the sequence of symbols on the communication channel in order to reconstruct transmitted data. In various applications, there may be a direct correspondence between a symbol and a unit of data (e.g., each symbol may encode one or more binary digits or bits), data may be represented by transitions between symbols, or data may be represented by a sequence of symbols.

Channel fading and interference are two examples of factors that cause a channel to vary in time and/or frequency. A communication system designed to work in an environment with channel fading and interference typically provides, in each transmission, a training sequence for obtaining an initial estimate of a channel and pilot sequences interspersed with a data-bearing signal to allow for tracking channel variations. In general, pilot sequences facilitate updating an estimated noise variance and consequently improve FEC decoder performance at the expense of reduced bandwidth efficiency.

A communication system may implement transmitters that use differential modulation instead of providing pilot sequences to conserve bandwidth efficiency when the rate of channel fluctuations is relatively slow compared to symbol duration. In differential modulation, a preceding transmitted symbol acts as reference for a current modulated symbol to facilitate non-coherent demodulation in the receiver.

Smart grid applications communicating over power lines are examples of differentially modulated systems. Power line communication channels are characterized by relatively slow channel variations but are also typically affected by impulse noise and narrow-band interference caused by the operation and switching of appliances, electronics, and other electrical devices connected to a power line. Some narrow-band interference may be present for the entire duration of a communication packet or may arise only for a limited time during a packet. Due to the nature of differential modulation, drastic instantaneous channel fluctuations may cause cascading demodulation errors that lead to significant degradation of soft information provided to an FEC decoder which results in degradation of overall system performance.

BRIEF DESCRIPTION OF THE DRAWINGS

Embodiments of the present invention are illustrated by way of example and are not limited by the accompanying figures, in which like references indicate similar elements. Elements in the figures are illustrated for simplicity and clarity and have not necessarily been drawn to scale.

FIG. 4 is a diagram of an exemplary weight block for the exemplary differential demodulator of FIG. 3.

FIG. 5 is a diagram of an exemplary normalization block for the exemplary differential demodulator of FIG. 3.

DETAILED DESCRIPTION

Figure 1:
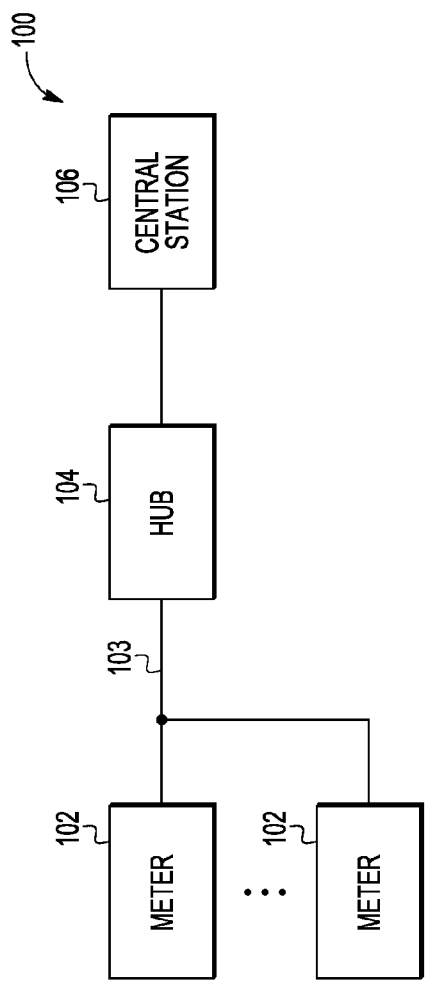
FIG. 1 is a block diagram of a relevant portion of a communication system that is configured to implement differential demodulation according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. As may be used herein, the term 'coupled' encompasses a direct electrical connection between elements or components and an indirect electrical connection between elements or components achieved using one or more intervening elements or components.

In general, forward error correction (FEC) mechanisms suffer performance losses if provided with hard bit decision inputs. Typically, the performance of FEC mechanisms can be improved by inputting bit log-likelihood ratios (LLRs) that carry soft information indicating the likelihood of each bit being a zero '0' or a one '1'. For example, an input to an FEC mechanism of +5 may indicate that a bit is likely to be zero '0' with high confidence, an input to an FEC mechanism of −5 may indicate that a bit is likely to be one '1' with high confidence, and an input to an FEC mechanism of +1 may indicate that a bit is likely to be zero '0' with low confidence. In differential demodulation, a channel estimate is not typically updated periodically and, as such, an initial channel estimate obtained from a signal preamble is normally used for bit LLR generation. That is, differential demodulation does not use pilot sequences and, as such, a differentially modulated channel cannot be tracked.

Due to the slow variation of frequency-selective channels, resulting bit LLRs may be suboptimal, which may lead to a loss in FEC performance. In power-line channels, impulses can occur frequently (e.g., when a load (e.g., motor) connected to a power system turns-on) and, as such, a power-line channel may widely fluctuate on a temporary basis. According to the present disclosure, techniques for generating bit LLRs for differential modulation schemes are disclosed that are resilient to channel fluctuations and generally boost FEC performance, as bit LLRs are typically more accurate. It should be appreciated that the disclosed techniques may be employed with various modulation schemes (e.g., quadrature amplitude modulation (QAM) and phase-shift keying (PSK) modulation schemes).

For example, implementing a symbol LLR weight calculator and a normalization value calculator generally improves resilience to wide but transient changes in channel conditions. With brief reference to FIGS. 6-8, simulated performance charts for generating bit LLRs according to the present disclosure show improvement over conventional schemes for generating bit LLRs for various PSK modulation schemes. The disclosed bit LLR generation techniques indicate improved performance in all simulated cases. Advantageously, the disclosed bit LLR generation techniques tend to reduce packet loss and, as such, reduce re-transmissions, reduce required transmission power, and increase throughput and coverage. The disclosed techniques are particularly useful under impulse noise conditions experienced by power-line channels. The disclosed techniques do not require interference detection and are robust to impulses, which are different from interference.

In one or more embodiments, the disclosed techniques utilize the greater of a squared amplitude of a reference symbol and a squared amplitude of a received symbol to produce a normalization value and employ a weighting factor that is computed based on an estimated signal to noise ratio (SNR). In general, conventional approaches to differential demodulation have not ensured good FEC performance under impulse noise conditions. It should be appreciated that while the disclosure focuses on power-line channels, the disclosed techniques may be advantageously employed in a wide variety of applications, e.g., any communication system that employs differential demodulation and is subject to varying channel conditions. In general, the disclosed techniques for calculating LLR weights and normalization values for all received symbols improve receiver performance which may generally translate to increased coverage area and/or increased data throughput.

According to one or more embodiments of the present disclosure, a technique for generating a bit log-likelihood ratio (LLR) in a communication system includes generating a symbol LLR weight based on a symbol signal-to-noise ratio (SNR) estimate for a received symbol. The technique also includes generating a demodulated signal based on a received symbol and a reference symbol. The technique further includes generating an input for a bit LLR generator based on the symbol LLR weight, the demodulated signal, and a normalization value that is based on the received symbol or the reference symbol. The technique also includes generating a bit LLR for the received symbol, using the bit LLR generator, based on the input. The techniques may be implemented in hardware (e.g., in an application specific integrated circuit (ASIC) or a field-programmable gate array (FPGA)) or using a combination of hardware and software (e.g., using a programmed general purpose processor or a programmed digital signal processor (DSP)).

With reference to FIG. 1, an exemplary communication system 100 is illustrated that includes a plurality of smart meters 102 that are configured, according to one or more embodiments of the present disclosure, to generate bit LLRs for received symbols. The communication system 100 also includes a hub 104 that is coupled to the meters 102 via a power-line 103. In various embodiments, the meters 102 and the hub 104 are coupled to the power-line 103 via a direct electrical connection. As is illustrated in FIG. 1, the hub 104 is coupled (e.g., via a direct electrical connection) to a central station 106. The central station 106 may include one or more processors (each of which may include one or more processor cores) coupled to a storage subsystem, which may include, for example, application appropriate amounts of memory (e.g., dynamic random access memory (DRAM), static RAM (SRAM), and/or read-only memory (ROM)), and/or one or more mass storage devices, such as magnetic media (tape or disk) drives and/or optical disk drives. It should be appreciated that the hub 104 and the central station 106 may also be configured to generate bit LLRs for received symbols, according to various embodiments of the present disclosure.

As used herein, a 'hub' is a device that couples multiple communication devices together to form a single network segment. In general, a hub has multiple input/output (I/O) ports, in which a signal introduced at an input of any port appears at an output of every port except the original incoming port. A hub may participate in collision detection and forward a jam signal to all ports if a collision is detected. The central station 106 may perform various functions. For example, the central station 106 may log periodic readings (e.g., gas, water, and/or electric readings) provided from the meters 102 to facilitate customer billing and/or control on-demand power capacity.

Figure 2:
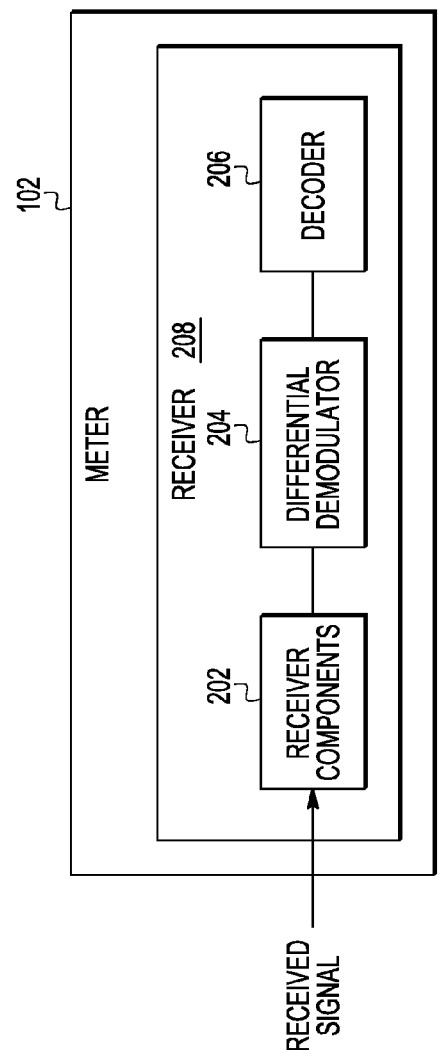
FIG. 2 is a block diagram of a relevant portion of an exemplary smart meter that may be employed in the communication system of FIG. 1.

With reference to FIG. 2, exemplary smart meter 102 is illustrated as including a receiver 208 that includes a receiver components block 202, a differential demodulator 204, and a decoder 206. The receiver components block 202 receives a received signal at an input. The receiver components block 202 is coupled to the differential demodulator 204, which is coupled to the decoder 206. For example, the RF components 102 may include a band-pass filter (BPF), a radio frequency (RF) amplifier, a frequency converter, a low-pass (LP) filter, and an orthogonal demodulator (all of which are not shown). The BPF reduces strong out-of-band signals and image frequency response. The RF amplifier is implemented to increase the sensitivity of the receiver 208 by amplifying weak received signals without contaminating the received signals with noise. In general the RF amplifier can be omitted (or switched off) for frequencies below 30 MHz, where signal-to-noise ratio (SNR) is defined by atmospheric and man-made noise. The frequency converter is configured to down-convert a received signal to an intermediate frequency (IF) and the LP filter is utilized to reject frequencies above the IF. The orthogonal demodulator is utilized to demodulate orthogonally modulated signals (e.g., orthogonal frequency division multiple access (OFDMA) signals) and may be omitted if the orthogonal modulation is not employed.

The differential demodulator 204 is configured to generate bit LLRs for received symbols according to the present disclosure. The decoder 206 may, for example, be implemented as a Viterbi decoder and functions to demodulated symbols. It should be appreciated that components of the receiver 208 that are not deemed desirable for understanding the disclosed subject matter have been omitted for brevity. It should be understood that meter 102 also includes a transmitter and other components (e.g., a monitoring device, input/output (I/O), and control circuitry), which have also been omitted for brevity.

Figure 3:
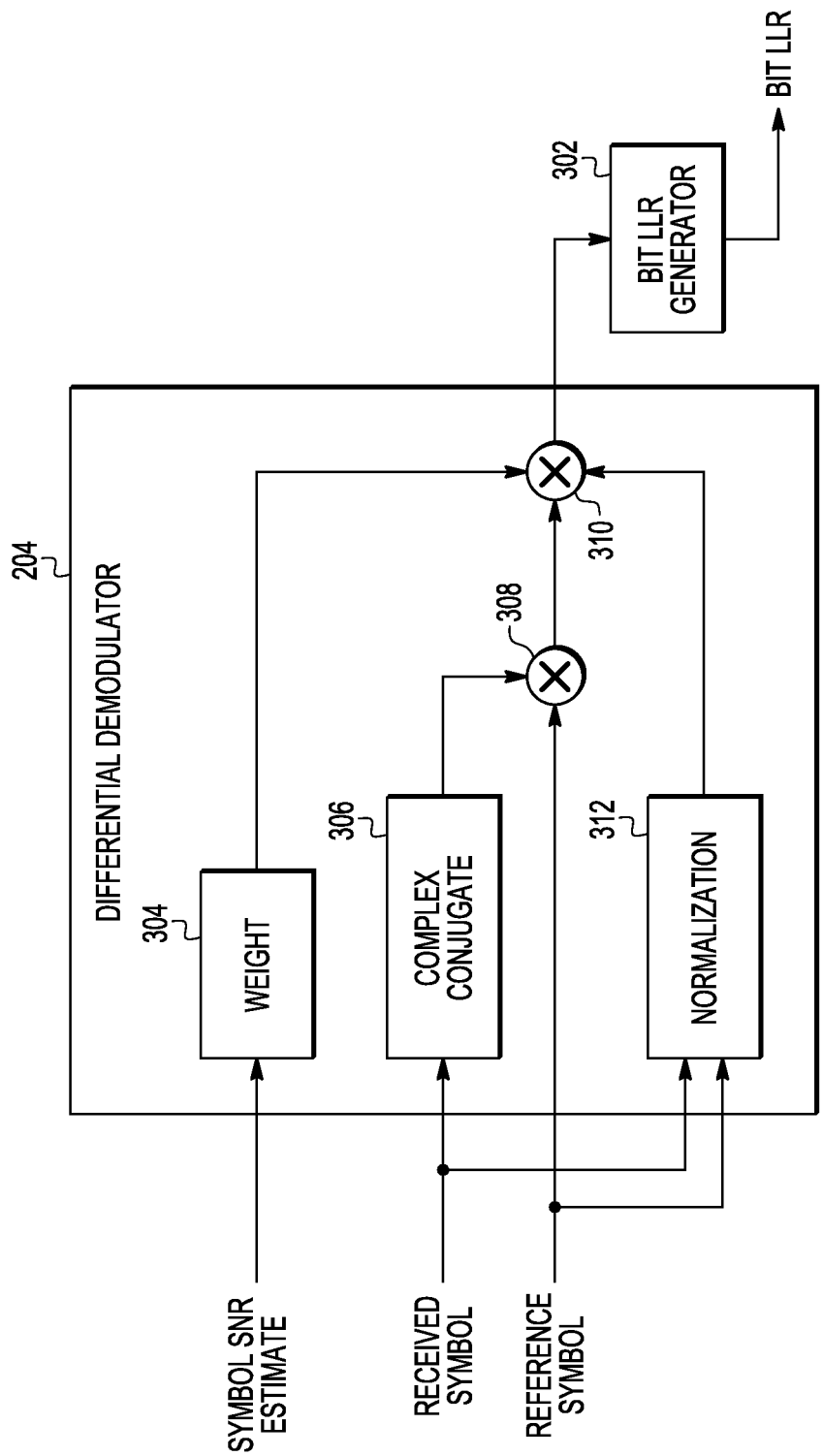
FIG. 3 is a block diagram of a relevant portion of an exemplary differential demodulator that may be employed in the differential demodulator of FIG. 2.

With reference to FIG. 3, the differential demodulator 204 is illustrated in additional detail. As is illustrated, the differential demodulator 204 includes a weight block 304, a complex conjugate block 306, multipliers 308 and 310, and a normalization block 312, all of which may be implemented in hardware or in a combination of hardware and software. The weight block 304 receives a symbol SNR estimate $\beta_k$ (from the receiver components 202) and produces a symbol LLR weight based on the symbol SNR estimate $\beta_k$. In the differential demodulator 204, the symbol LLR weight is provided to a first input of the multiplier 310. It should be appreciated that the weight block 304 may be omitted from the differential demodulator 204 in various cases. For example, weights are not required when demodulated hard bits are provided as inputs to an FEC decoder. The complex conjugate block 306 receives a received symbol $s_k$ (e.g., an OFDM symbol that transmitted from the central station 106) and produces a complex conjugate of the received symbol $s_k$, which is provided to a first input of the multiplier 308. A second input of the multiplier 308 receives a reference symbol $r_k$ (e.g., another OFDM symbol). The reference symbol $r_k$ may, for example, be transmitted from the central station 106 and received via the hub 104.

An output of the multiplier 308 provides a demodulated signal that is provided to a second input of the multiplier 310. A first input of the normalization block 312 receives the received symbol and a second input of the normalization block 312 receives the reference symbol $r_k$. An output of the normalization block 312 is provided to a third input of the multiplier 310. According to various embodiments of the present disclosure, the normalization block 312 selects a larger of a maximum squared amplitude of the received symbol and the reference symbol. A reciprocal of the larger of the maximum squared amplitude of the received symbol $s_k$ and the reference symbol $r_k$ is provided as an output of the normalization block 312. An output of the third multiplier 310 is provided to an input of a bit LLR generator 302, which may, for example, be implemented in the decoder 206. An output of the LLR generator 302 provides a bit LLR, which is used by the decoder 206 to determine the likelihood of a given received symbol bit being a zero '0' or a one '1'. For example, a bit LLR of +4 may indicate that a bit is likely to be zero '0' with high confidence, a bit LLR of −4 may indicate that a bit is likely to be one '1' with a high confidence, and an input of −1 may indicate that a bit is likely to be one '1' with low confidence.

With reference to FIG. 4, an exemplary weight for the weight block 304 is illustrated. In FIG. 4, the symbol LLR weight $b_k$ is equal to $\beta_k^2/2\beta_k+1$, where $\beta_k$ is the symbol SNR estimate. It should be appreciated that a different formula may be employed to calculate symbol LLR weights according to the present disclosure. For example, the symbol LLR weight $b_k$ may be set equal to $\beta_k^2/2\beta_k$.

With reference to FIG. 5, components of an exemplary normalization block 312 are further illustrated. As is shown in FIG. 5, squared amplitude block 502 receives the received symbol $s_k$ (which may be, for example, a real symbol or a complex symbol) as an input and provides a squared received symbol $p_k$ as an output. Similarly, squared amplitude block 504 receives the reference symbol $r_k$ as an input and provides a squared reference symbol $q_k$ as an output. Block 506 selects a maximum $x_k$ of the squared received symbol $p_k$ and the squared reference symbol $q_k$ and provides the maximum $x_k$ to a reciprocal block 508. The reciprocal block 508 calculates a reciprocal $y_k$ of the maximum $x_k$ and provides the reciprocal $y_k$ (or normalization value) to a third input of the multiplier 310.

Figure 6:
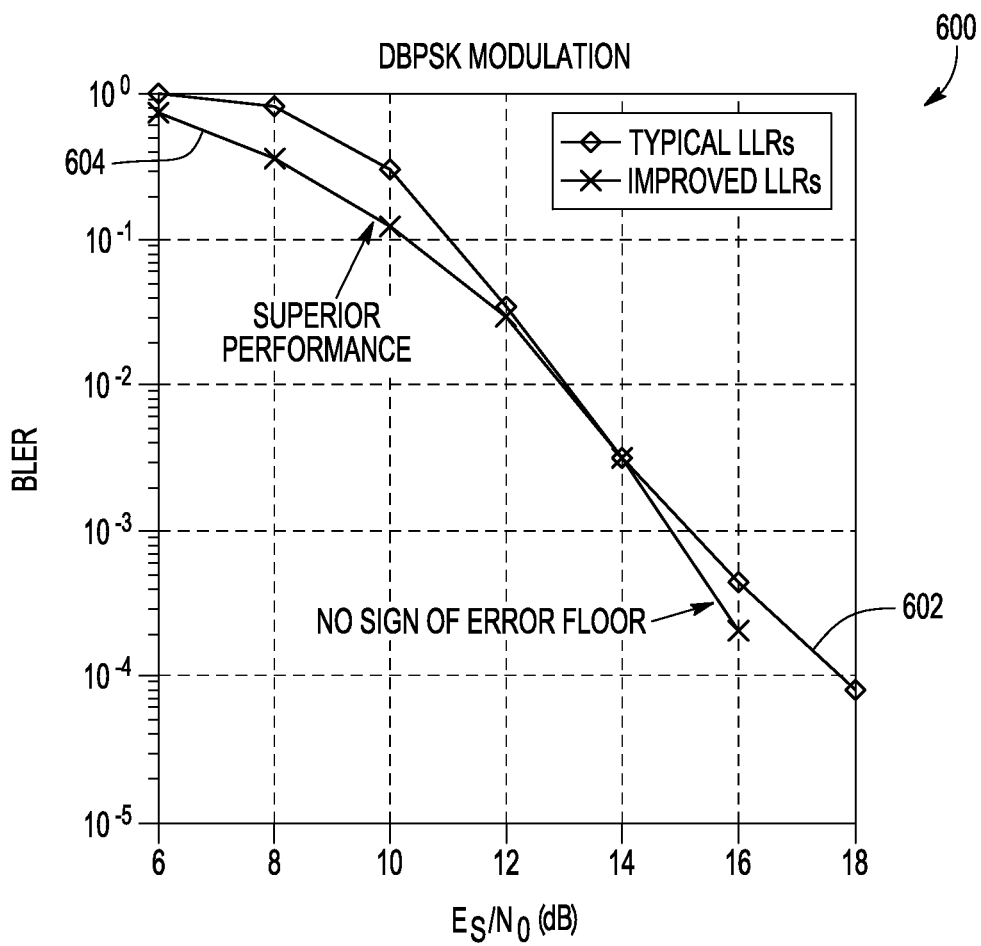
FIG. 6 is a simulated performance graph that plots signal-to-noise ratio (SNR) versus block error rate (BLER) for a conventional communication system and a communication system configured according to an embodiment of the present invention, both of which implement differential binary phase-shift keying (DBPSK) modulation.

With reference to FIG. 6, a simulated performance graph 600 plots signal-to-noise ratio (SNR), $E_s/N_o$, versus block error rate (BLER) for a conventional communication system (see line 602) and a communication system configured according to an embodiment of the present invention (see line 604), both of which implement differential binary phase-shift keying (DBPSK) modulation. For DBPSK modulation, the line 604 indicates superior performance and no sign of an error floor (i.e., a region in which performance flattens).

Figure 7:
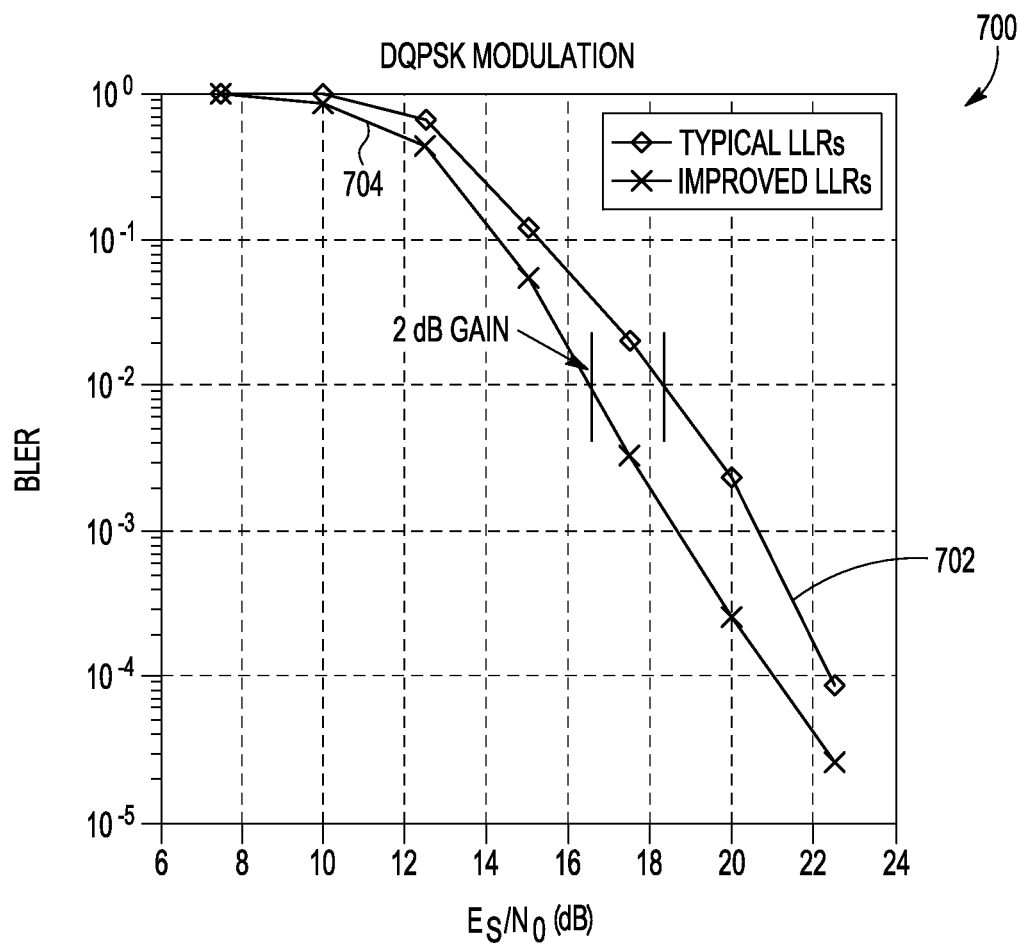
FIG. 7 is a simulated performance graph that plots SNR versus BLER for a conventional communication system and a communication system configured according to an embodiment of the present invention, both of which implement differential quadrature phase-shift keying (DQPSK) modulation.

With reference to FIG. 7, a simulated performance graph 700 plots SNR versus BLER for a conventional communication system (see line 702) and a communication system configured according to an embodiment of the present invention (see line 704), both of which implement differential quadrature phase-shift keying (DQPSK) modulation. For DQPSK modulation, the line 704 indicates superior performance and a 2 dB gain at one percent BLER.

Figure 8:
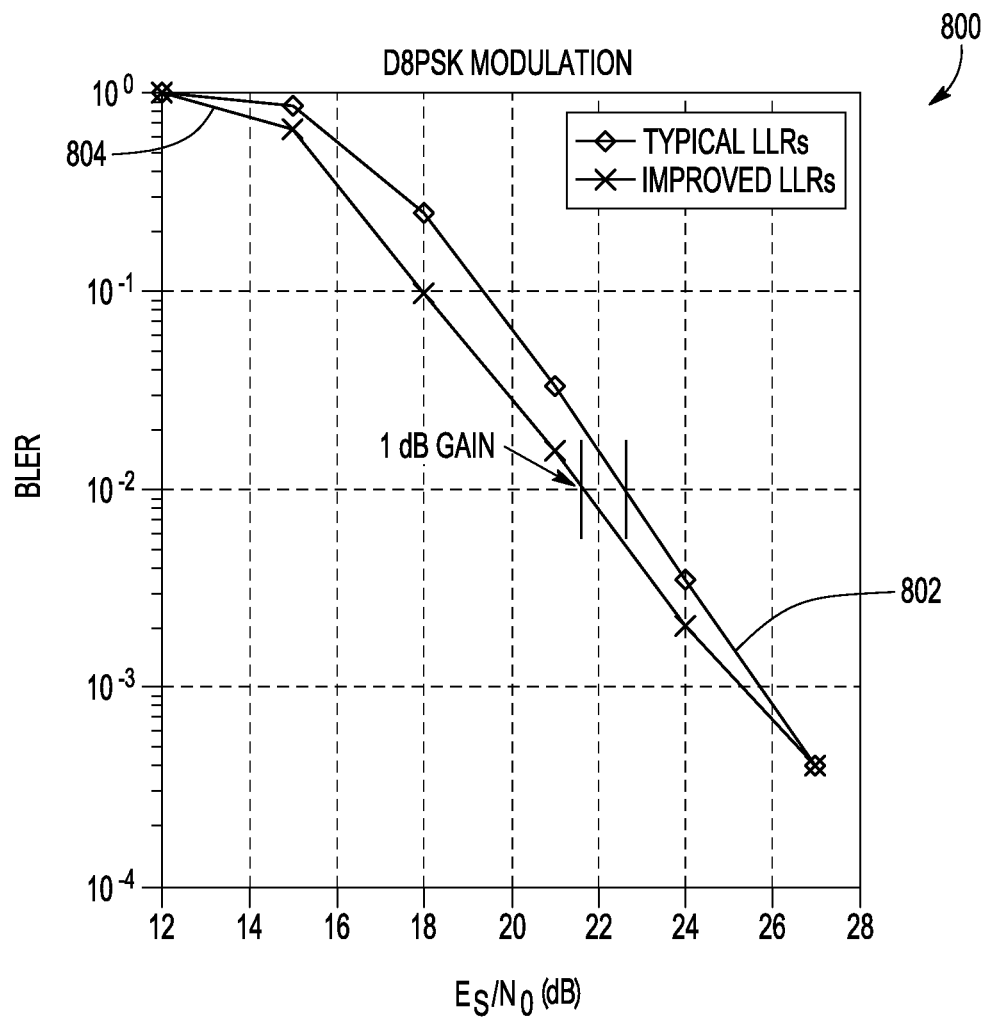
FIG. 8 is a simulated performance graph that plots SNR versus BLER for a conventional communication system and a communication system configured according to an embodiment of the present invention, both of which implement differential eight phase-shift keying (D8PSK) modulation.

With reference to FIG. 8, a simulated performance graph 800 plots SNR versus BLER for a conventional communication system (see line 802) and a communication system configured according to an embodiment of the present invention (see line 804), both of which implement differential eight phase-shift keying (D8PSK) modulation. For D8PSK modulation, the line 804 indicates superior performance and a 1 dB gain at one percent BLER.

Figure 9:
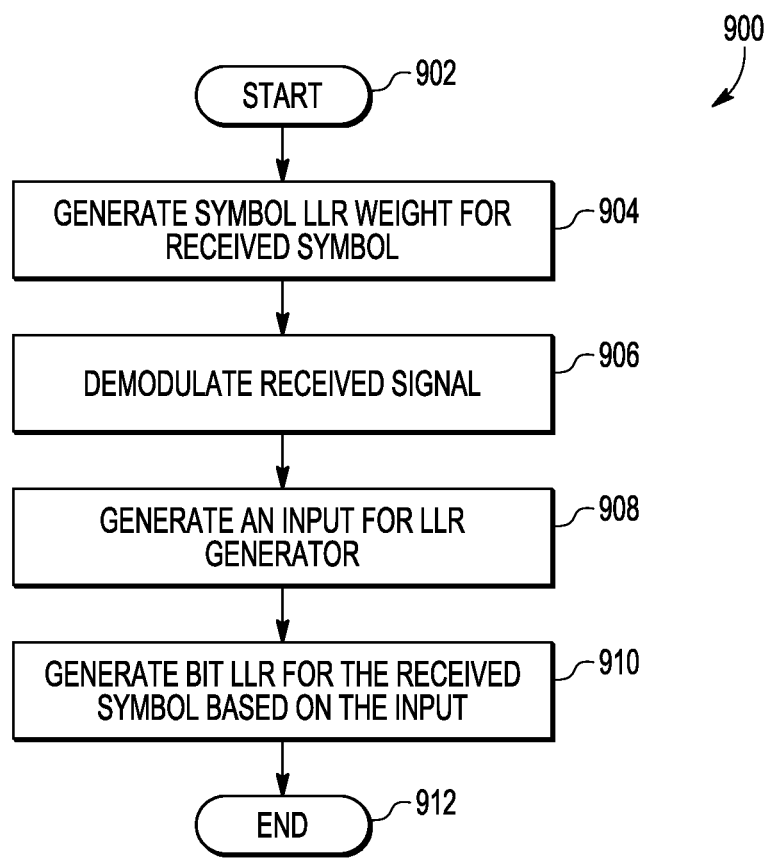
FIG. 9 is a flowchart of a process for generating a bit log-likelihood ratio (LLR) in a communication system configured according to an embodiment of the present invention.

With reference to FIG. 9, a process 900 for generating a bit log-likelihood ratio (LLR) in a communication system is illustrated. In block 902 the process 900 is initiated (e.g., in response to receiving a received symbol), at which point control transfers to block 904. In block 904, the differential demodulator 204 generates a symbol LLR weight based on a symbol signal-to-noise ratio (SNR) estimate for a received symbol $s_k$. For example, the symbol LLR weight $b_k$ may be equal to $\beta_k^2/2\beta_k+1$, where $\beta_k$ is the symbol SNR estimate. Next, in block 906, the differential demodulator 204 generates a demodulated signal based on the received symbol $s_k$ and a reference symbol $r_k$. For example, the demodulated signal may be derived by multiplying a complex conjugate of the received symbol $s_k$ by the reference symbol $r_k$. Then, in block 908, the differential demodulator 204 generates an input for a bit LLR generator 302 based on the symbol LLR weight $b_k$, the demodulated signal, and a normalization value $y_k$ (which is based on the received symbol $s_k$ or the reference symbol $r_k$).

For example, the normalization value $y_k$ may be derived by: generating a squared amplitude $p_k$ of the received symbol $s_k$; generating a squared amplitude $q_k$ of the reference symbol $r_k$; generating a maximum $x_k$ of the received signal squared amplitude $p_k$ and the reference symbol squared amplitude $q_k$; and generating the normalization value $y_k$ from a reciprocal of the maximum $x_k$. Next, in block 910, the LLR generator 302, generates a bit LLR for the received symbol based on the input. Finally, in block 912, the process 900 terminates until a next symbol is received.

Accordingly, techniques have been disclosed herein that advantageously generate bit log-likelihood ratios (LLRs) for a communication system, e.g., power-line communication system, that implements differential modulation.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of generating a bit log-likelihood ratio (LLR) in a communication system, comprising:
    generating, by a receiver, a symbol LLR weight $b_k$, where $b_k$ is the $k^{th}$ symbol LLR weight, based on a symbol signal-to-noise ratio (SNR) estimate for a received symbol $s_k$, where $s_k$ is the $k^{th}$ received symbol;
    generating, by the receiver, a demodulated signal based on the received symbol $s_k$ and a reference symbol $r_k$, where $r_k$ is the $k^{th}$ reference symbol;
    generating a squared amplitude $p_k$ of the received symbol $s_k$, where $p_k$ is the $k^{th}$ squared amplitude of the $k^{th}$ received symbol;
    generating a squared amplitude $q_k$ of reference symbol $r_k$, where $q_k$ is the $k^{th}$ squared amplitude of the $k^{th}$ reference symbol;
    determining a maximum $x_k$ of the squared amplitude $p_k$ and the squared amplitude $q_k$, where $x_k$ is the $k^{th}$ maximum of the squared amplitude of the $k^{th}$ received symbol and the squared amplitude of the $k^{th}$ reference symbol; and
    generating the normalization value $y_k$ from a reciprocal maximum $x_k$, where $y_k$ is the $k^{th}$ normalization value;
    generating, by the receiver, an input for a bit LLR generator based on the symbol LLR weight $b_k$, the demodulated signal, and the normalization value $y_k$; and
    generating, using the bit LLR generator, a bit LLR for the received symbol $s_k$ based on the input.

2. The method of claim 1, wherein the symbol LLR weight $b_k$ is equal to $\beta_k^2/2\beta_k+1$, where $\beta_k$ is the symbol SNR estimate.

3. The method of claim 1, wherein the demodulated signal is derived by multiplying a complex conjugate of the received symbol $s_k$ by the reference symbol $r_k$.

4. The method of claim 1, wherein the communication system implements differential phase-shift keying modulation.

5. The method of claim 1, wherein the communication system implements differential quadrature amplitude modulation.

6. The method of claim 1, further comprising:
    decoding, using a decoder coupled to the bit LLR generator, the bit LLR to decode the received symbol $s_k$.

7. The method of claim 1, wherein the communication system is a power-line communication system.

8. A receiver included in a meter that measures electricity, comprising:
    a demodulator configured to generate a demodulated signal based on a received symbol $s_k$ and a reference symbol $r_k$ and an output based on the demodulated signal and a normalization value $y_k$ that is based on the received symbol $s_k$ or the reference symbol $r_k$, where $r_k$ is the $k^{th}$ reference symbol; and
    a bit LLR generator configured to generate a bit LLR for the received symbol $s_k$, where $s_k$ is the $k^{th}$ received symbol, based on the output;
    wherein the demodulator is further configured to generate a symbol LLR weight $b_k$ based on a symbol signal-to-noise ratio (SNR) estimate for the received symbol $s_k$, and the output is also based on the symbol LLR weight $b_k$, where $b_k$ is the $k^{th}$ symbol LLR weight; wherein the demodulator is further configured to generate a squared amplitude $p_k$ of the received symbol $s_k$, where $p_k$ is the $k^{th}$ squared amplitude of the $k^{th}$ received symbol, a squared amplitude $q_k$ of the reference symbol $r_k$, where $q_k$ is the $k^{th}$ squared amplitude of the $k^{th}$ reference symbol, a maximum $x_k$ of the received signal squared amplitude $p_k$ and the reference symbol squared amplitude $q_k$, where $x_k$ is the $k^{th}$ maximum of the squared amplitude of the $k^{th}$ received symbol and the squared amplitude of the $k^{th}$ reference symbol, and the normalization value $y_k$ from a reciprocal of the maximum $x_k$, where $y_k$ is the $k^{th}$ normalization value.

9. The receiver of claim 8, wherein the demodulated signal is derived by multiplying a complex conjugate of the received symbol $s_k$ by the reference symbol $r_k$.

10. The receiver of claim 8, further comprising:
    a decoder coupled to the bit LLR generator, wherein the decoder is configured to utilize the bit LLR to decode the received symbol $s_k$.

11. The receiver of claim 8, wherein the receiver implements one of differential binary phase-shift keying (DBPSK) modulation, differential quadrature phase-shift keying (DQPSK) modulation, and differential eight phase-shift keying (D8PSK) modulation.

12. The receiver of claim 8, wherein the receiver implements differential phase-shift keying modulation or differential quadrature amplitude modulation, and wherein the receiver is implemented in a central station.

13. The meter of claim 8, wherein the symbol LLR weight $b_k$ is equal to $\beta_k^2/2\beta_k+1$, where $\beta_k$ is the symbol SNR estimate.

14. The meter of claim 8, wherein the demodulated signal is derived by multiplying a complex conjugate of the received symbol $s_k$ by the reference symbol $r_k$.

15. The meter of claim 8, wherein the meter implements one of differential phase-shift keying modulation and differential quadrature amplitude modulation.

* * * * *